(12) United States Patent
Medina Acosta et al.

(10) Patent No.: US 11,329,775 B2
(45) Date of Patent: May 10, 2022

(54) SUB-PHYSICAL RESOURCE BLOCK (SUB-PRB) TRANSMISSIONS OVER A PHYSICAL UPLINK SHARED CHANNEL (PUSCH)

(71) Applicant: Telefonaktiebolaget LM Ericsson (publ), Stockholm (SE)

(72) Inventors: Gerardo Agni Medina Acosta, Märsta (SE); Johan Bergman, Stockholm (SE); Anders K Eriksson, Uppsala (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 33 days.

(21) Appl. No.: 16/651,022

(22) PCT Filed: Sep. 28, 2018

(86) PCT No.: PCT/EP2018/076432
§ 371 (c)(1),
(2) Date: Mar. 26, 2020

(87) PCT Pub. No.: WO2019/063777
PCT Pub. Date: Apr. 4, 2019

(65) Prior Publication Data
US 2020/0280406 A1    Sep. 3, 2020

Related U.S. Application Data

(60) Provisional application No. 62/564,911, filed on Sep. 28, 2017.

(51) Int. Cl.
*H04W 72/04* (2009.01)
*H04L 5/00* (2006.01)
(Continued)

(52) U.S. Cl.
CPC ....... *H04L 5/0044* (2013.01); *H04W 72/0453* (2013.01); *H04L 27/34* (2013.01); *H04W 84/042* (2013.01)

(58) Field of Classification Search
CPC .. H04L 27/34; H04L 5/0044; H04W 72/0453; H04W 84/042
See application file for complete search history.

(56) References Cited

U.S. PATENT DOCUMENTS

2019/0082441 A1\* 3/2019 Liu .................. H04W 72/0453

FOREIGN PATENT DOCUMENTS

| EP | 3432663 A1 | 1/2019 |
|---|---|---|
| WO | 2017157115 A1 | 9/2017 |
| WO | 2019063777 A1 | 4/2019 |

OTHER PUBLICATIONS

3GPP TSG-RAN#88bis R1-1705196; Title: Revised WID: LTE Advanced inter-band CA Rel-14 for 3DL/1UL; Agenda Item: 7.2.6.6; Source: Ericsson; Document for: Discussion; Location and Date: Spokane, United States Apr. 3-7, 2017, consisting of 4-pages.
(Continued)

*Primary Examiner* — Lester G Kincaid
*Assistant Examiner* — Dung L Lam
(74) *Attorney, Agent, or Firm* — Christopher & Weisberg, P.A.

(57) ABSTRACT

A method, wireless device and network node for supporting sub-physical resource block transmissions over a physical uplink shared channel, PUSCH, are disclosed. According to one aspect, a method includes receiving an indication of a number of resource units to be used for performing sub-PRB transmissions over the PUSCH. The method further includes mapping the number of RUs to a number of physical resource blocks, PRBs and determining a transport block size, TBS, for a sub-PRB transmission over the PUSCH, based on the mapping of the number of RUs to the number
(Continued)

of PRBs. The method also includes transmitting sub-PRB transmissions over the PUSCH according to the determined TBS on the number of RUs.

12 Claims, 10 Drawing Sheets

(51) Int. Cl.
    *H04L 27/34*     (2006.01)
    *H04W 84/04*     (2009.01)

(56) References Cited

OTHER PUBLICATIONS

3GPP TSG-RAN Meeting #75 R1-170309; Title: Increased PUSCH spectral efficiency for MTC; Agenda Item: 10.5.3; Source: Huawei, HiSilicon; Document for: Approval; Location and Date: Dubrovnik, Croatia Mar. 6-9, 2017, consisting of 38-pages.
3GPP TSG-RAN Meeting #75 R1-170732; Title: New WID on Even further enhanced MTC for LTE; Agenda Item: 10.1.1; Source: Ericsson, Qualcomm; Document for: Approval; Location and Date: Dubrovnik, Croatia Mar. 6-9, 2017, consisting of 4-pages.
3GPP TSG-RAN WG1 Meeting #88bis R1-1704697; Title: PUSCH spectral efficiency increase for efeMTC; Agenda Item: 7.2.6.6; Source: Intel Corporation; Document for: Discussion/Decision; Location and Date: Spokane, United States Apr. 3-7, 2017, consisting of 4-pages.
3GPP TSG-RAN WG1 #88-bis R1-1705016; Title: Increased PUSCH spectral efficiency; Agenda Item: 7.2.6.6; Source Qualcomm Incorporated; Document for: Discussion/Decision; Location and Date: Spokane, United States Apr. 3-7, 2017, consisting of 2-pages.
3GPP TSG-RAN WG1 Meeting #88bis R1-1705042; Title: Increasing PUSCH spectral efficiency in efeMTC; Agenda Item: 7.2.6.6; Source: Nokia, Alcatel-Lucent Shanghai Bell; Document for: Discussion/Decision; Location and Date: Spokane, United States Apr. 3-7, 2017, consisting of 4-pages.
3GPP TSG-RAN WG1 Meeting #88bis R1-1705202; Title: Sub-PRB transmission in efeMTC; Agenda Item: 7.2.6.6; Source: Sony; Document for: Discussion/Decision; Location and Date: Spokane, United States Apr. 3-7, 2017, consisting of 5-pages.
3GPP TSG-RAN WG1 Meeting #88bis R1-1705251; Title: eMTC UL Spectral Efficiency Solution Analysis; Agenda Item: 7.2.6.6; Source: Sierra Wireless; Document for: Discussion/Decision; Location and Date: Spokane, United States Apr. 3-7, 2017, consisting of 9-pages.
3GPP TSG-RAN WG1 Meeting #88bis R1-1705308; Title: PUSCH Spectral Efficiency Enhancements; Agenda Item: 7.2.6.6; Source: Samsung; Document for: Discussion/Decision; Location and Date: Spokane, United States Apr. 3-7, 2017, consisting of 3-pages.
3GPP TSG-RAN WG1 Meeting #88bis R1-1705486; Title: Support of increased PUSCH spectral efficiency for MTC; Agenda Item: 7.2.6.6; Source: ZTE, ZTE Microelectronics; Document for: Discussion/Decision; Location and Date: Spokane, United States Apr. 3-7, 2017, consisting of 3-pages.
3GPP TSG-RAN WG1 Meeting #88bis R1-1705651; Title: Design of PUSCH for even further eMTC; Agenda Item: 7.2.6.6; Source: Lenovo, Motorola Mobility; Document for: Discussion/Decision; Location and Date: Spokane, United States Apr. 3-7, 2017, consisting of 4-pages.
3GPP TSG-RAN WG1 Meeting #88bis R1-1705809; Title: On PUSCH spectral efficiency enhancement; Agenda Item: 7.2.6.6; Source: Huawei, HiSilicon; Document for: Discussion/Decision; Location and Date: Spokane, United States Apr. 3-7, 2017, consisting of 3-pages.
3GPP TSG-RAN WG1 Meeting #88bis R1-1705467; Title: Sub-PRB resource allocation for MTC PUSCH; Agenda Item: 7.2.6.6; Source: Sharp; Document for: Discussion/Decision; Location and Date: Spokane, United States Apr. 3-7, 2017, consisting of 3-pages.
3GPP TSG-RAN WG1 Meeting #89 R1-1707093; Title: Discussion on increased PUSCH spectral efficiency for MTC; Agenda Item: 6.2.6.5; Source: ZTE; Document for: Discussion/Decision; Location and Date: Hangzhou, China May 15-19, 2017, consisting of 5-pages.
3GPP TSG-RAN WG1 Meeting #89 R1-1707318; Title: PUSCH spectral efficiency increase for efeMTC; Agenda Item: 6.2.6.5; Source: Intel Corporation; Document for: Discussion/Decision; Location and Date: Hangzhou, P.R. China May 15-19, 2017, consisting of 13-pages.
3GPP TSG-RAN WG1 Meeting #89 R1-1708312; Title: PUSCH Spectral Efficiency Solution Analysis; Agenda Item: 6.2.6.5; Source: Sierra Wireless; Document for: Discussion/Decision; Location and Date: Hangzhou, P.R. China May 15-19, 2017, consisting of 10-pages.
3GPP TSG-RAN WG1 Meeting #89 R1-1708799; Title: Increased PUSCH spectral efficiency; Agenda Item: 6.2.6.5; Source: Qualcomm Incorporated; Document for: Discussion/Decision; Location and Date: Hangzhou, P.R. China May 15-19, 2017, consisting of 3-pages.
3GPP TSG-RAN WG1 Meeting #89 R1-1707865; Title: Increasing PUSCH spectral efficiency; Agenda Item: 6.2.6.5; Source: Nokia, Alcatel-Lucent Shanghai Bell; Document for: Discussion/Decision; Location and Date: Hangzhou, China May 15-19, 2017, consisting of 5-pages.
3GPP TSG-RAN WG1 Meeting #89 R1-1708249; Title: PUSCH spectral efficiency techniques for efeMTC; Agenda Item: 6.2.6.5; Source: Sony; Document for: Discussion/Decision; Location and Date: Hangzhou, P.R. China May 15-19, 2017, consisting of 3-pages.
3GPP TSG-RAN WG1 Meeting #90 R1-1712987; Title: Increased PUSCH spectral efficiency for MTC; Agenda Item: 5.2.6.5; Source: Ericsson; Document for: Discussion; Location and Date: Prague, Czech Republic Aug. 21-25, 2017, consisting of 7-pages.
EPO Communication dated Mar. 26, 2021 for International Application No. 18780099.0 consisting of 6-pages.
3GPP TSG-RAN WG1 Meeting #89 R1-1706885; Title: Increased PUSCH spectral efficiency for MTC; Agenda Item: 6.2.6.5; Source: Ericsson; Document for: Discussion; Date and Location: May 15-19, 2017, Hangzhou, P.R. China, consisting of 4-pages.
3GPP TSG RAN WG1 Meeting #89 R1-1708366; Title: Increased PUSCH spectral efficiency for efeMTC; Agenda Item: 6.2.6.5; Source: Sharp; Document for: Discussion and Decision; Date and Location: May 15-19, 2017, Hangzhou, P.R. China, consisting of 4-pages.
3GPP TSG RAN WG1 Meeting #89 R1-1708853; Title: On UL spectral efficiency enhancement; Agenda Item: 6.2.6.5; Source: Huawei, HiSilicon; Document for: Discussion and decision; Date and Location: May 15-19, 2017, Hangzhou, China, consisting of 3-pages.
3GPP TSG-RAN WG1 #89 R1-1708873; Title: Discussion on UL and overall spectral efficiency improvement; Agenda Item: 6.2.6.5; Source: Sequans Communications; Document for: Discussion and Decision; Date and Location: May 15-19, 2017, Hangzhou, China, consisting of 6-pages.
3GPP TSG RAN WG1 Meeting #90 R1-1715131; Title: Chairman's notes of AI 5.2.6 on Even Further Enhanced MTC for LTE; Agenda Item: 5.2.6; Source: Ad-Hoc chair (Ericsson); Document for: Endorsement; Date and Location: Aug. 21-25, 2017, Prague, Czech Republic, consisting of 3-pages.
3GPP TSG-RAN WG1 Meeting #90 R1-1717000; Title: Increased PUSCH spectral efficiency for MTC; Agenda Item: 6.2.5.6; Source: Ericsson; Document for: Discussion; Date and Location: Oct. 9-13, 2017, Prague, Czech Republic consisting of 6-pages.
International Search Report and Written Opinion dated Jan. 14, 2019 for International Application No. PCT/EP2018/076432 filed on Sep. 28, 2018, consisting of 10-pages.
3GPP TR 45.820 V13.1.0 3rd Generation Partnership Project; Technical Specification Group GSM/EDGE Radio Access Network; Cellular system support for ultra-low complexity and low throughput Internet of Things (CIoT) (Release 13); Nov. 2015, consisting of 495-pages.

* cited by examiner

| MCS | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1000 |

| | |
|---|---|
| A | 1 RU |
| B | 2 RUs |
| C | 4 RUs |

FIG. 10

SUB-PHYSICAL RESOURCE BLOCK (SUB-PRB) TRANSMISSIONS OVER A PHYSICAL UPLINK SHARED CHANNEL (PUSCH)

CROSS-REFERENCE TO RELATED APPLICATIONS

This application is a Submission Under 35 U.S.C. § 371 for U.S. National Stage Patent Application of International Application No.: PCT/EP2018/076432, filed Sep. 28, 2018 entitled "SUB-PHYSICAL RESOURCE BLOCK (SUB-PRE) TRANSMISSIONS OVER A PHYSICAL UPLINK SHARED CHANNEL (PUSCH)," which claims priority to U.S. Provisional Application No. 62/564,911, filed Sep. 28, 2017, entitled "DUAL USABILITY OF RESOURCES (FREQUENCY TO TIME DOMAIN MAPPING) FOR INTRODUCING SUB-PHYSICAL RESOURCE BLOCK TRANSMISSION," the entireties of both of which are incorporated herein by reference.

TECHNICAL FIELD

This disclosure relates to wireless communications, and in particular, to sub-physical resource blocks (sub-PRB) transmissions over the Physical Uplink Shared Channel (PUSCH).

BACKGROUND

The Third Generation Partnership Project (3GPP) is currently studying techniques for achieving an increased Physical Uplink Shared Channel (PUSCH) spectral efficiency, by for example sub-physical resource block (sub-PRB) allocation with no less than 3 subcarriers within a sub-PRB allocation. In studies, there is no intention to lower the minimum required wireless device capability compared to wireless device category M1, so the wireless device should still support a PUSCH transmission of 6 PRBs.

A sub-PRB technique may improve spectral efficiency by increasing the subcarrier allocation granularity within a PRB, which is made of 12 subcarriers. For example, by using the sub-PRB technique, two bandwidth-low complexity/coverage enhancement (BL/CE) devices can coexist with a PRB when each of them are allocated with 6 subcarriers, which represents a 100% spectral efficiency improvement. Similarly, four BL/CE devices could be allocated with 3 subcarriers each, leading to a 300% spectral efficiency improvement. Recent investigations performed during the studies on increasing the PUSCH spectral efficiency have determined that the sub-PRB technique will be added to the LTE standard. Thus, one objective of the current studies is to identify the most suitable way of introducing sub-PRB into the PUSCH for enhanced machine type communication (eMTC).

Reducing the resource utilization in the frequency domain is typically compensated by extending the resource utilization in the time domain. This is the case of the sub-PRB design in narrow band Internet of things (NB-IoT), which introduced the Resource Unit (RU) concept for establishing the transmission duration as a function of the number of allocated subcarriers. See for example 3GPP TR 45.820 V13.1.0 (2015-11).

In NB-IoT, a resource unit (RU) is the smallest unit over which a Transport Block can be mapped. The RU duration depends on the number of allocated subcarriers, and the size of the subcarrier spacing which determines the slot duration as shown in Table 1.

TABLE 1

Resource Unit duration as function of the subcarrier spacing, slot duration, and number of allocated subcarriers

| Subcarrier spacing | Slot duration | Number of allocated subcarriers | Length of the Resource Unit |
|---|---|---|---|
| 15 KHz | 0.5 ms | 12 | 1 ms |
|  |  | 6 | 2 ms |
|  |  | 3 | 4 ms |
|  |  | 1 | 8 ms |
| 3.75 KHz | 2 ms | 1 | 32 ms |

Moreover, in NB-IoT a transport block size (TBS) can be mapped over one RU or multiple resource units as illustrated in FIG. 1. FIG. 1 shows examples of (a) a full PRB (top left), (b) a TBS mapped over a resource unit (RU) lasting 2 ms (top right) with 6 subcarriers allocated to the RU, (c) a TBS mapped over 3 RUs lasting 1 ms each (middle) with 12 subcarriers allocated to each RU, and (d) a TBS mapped over 3 RUs lasting 2 ms each (bottom) with 6 subcarriers allocated to each RU. (The letter U in FIG. 1 denotes the uplink.)

In NB-IoT, in addition to using multiple RUs for mapping a TBS, the number of scheduled RUs can be repeated 1, 2, 4, 8, 16, 32, 64, 128, or 256 times. FIG. 2 shows an example for a resource mapping with repetitions, when the downlink control information (DCI) Format NO has indicated the following: Subcarrier indication, 12-tone allocation, Number of resource units, 2, and Number of NPUSCH repetitions, 4.

As can be seen from FIG. 2, the transport block is mapped over 2 RUs lasting each for 1 ms, and then repeated four times. One way of introducing the support of sub-PRB over PUSCH is by re-using the NB-IoT framework. Now that the Resource Unit concept as designed for NB-IoT has been described, the question is whether the same principles should be inherited for the support of sub-PRB for PUSCH in eMTC.

Adopting Resource Units (RU) of variable lengths, as defined in NB-IoT for performing sub-PRB transmissions, is in principle not compatible with the PUSCH, since the Transport Block (TB) to be transmitted using PUSCH is always mapped over one transmission time interval (TTI) having a duration equal to 1 ms.

Also, the sub-PRB transmission as defined for NB-IoT can make use of subcarrier spacings equal to 15 KHz or 3.75 KHz, 3.75 KHz not being compatible with PUSCH. The sub-PRB transmission as defined for NB-IoT can consist of 1, 3, 4, and 12 subcarriers. The modulation schemes ($\pi/2$-binary phase shift keyed (BPSK), and $\pi/4$-quadrature PSK (QPSK)) being used for single tone (i.e., 1 subcarrier) are not supported for PUSCH transmissions. Further, the number of repetitions defined for the sub-PRB transmissions in NB-IoT differs from the ones specified for performing transmissions over PUSCH.

SUMMARY

The present Application provides support for low complexity, coverage enhanced machine type communications devices within existing systems through increased physical uplink shared channel spectral efficiency. Embodiments herein aim to enable the introduction of resource units of variable length with minimal impact to standardized interfaces and implementations.

Embodiments herein address the resource utilization issues of existing systems by providing sub-PRB transmissions over the PUSCH. The number of PRBs that can be allocated to a given MTC device can take the role of the number of Resource Units (i.e., a dual interpretation of resources where the PRB become RU for sub-PRB transmissions), which enables utilization of the RU concept from NB-IoT without imposing significant impacts on either specifications and/or implementation. This in turn allows for efficient resource utilization.

The modulation scheme can be unified to quadrature phase shift keying (QPSK) for the transport block sizes (TBS) that, in principle, require the usage of a higher order modulation (e.g. 16-quadrature amplitude modulation (16-QAM)). Present embodiments include indicating, via higher layers, a fall back to QPSK when those transport block sizes (TBS) are to be used, relying on repetitions using different redundancy versions for transmitting such large TB sizes.

According to one aspect, a method performed by a wireless device for supporting sub-PRB transmissions over a PUSCH is provided. The method includes receiving an indication of a number of resource units, RUs, to be used for performing sub-PRB transmissions over the PUSCH. The method further includes mapping the number of RUs to a number of physical resource blocks, PRBs and determining a transport block size, TBS, for a sub-PRB transmission over the PUSCH, based on the mapping of the number of RUs to the number of PRBs. The method also includes transmitting sub-PRB transmissions over the PUSCH according to the determined TBS on the number of RUs.

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs. In some embodiments, a duration of an RU depends on the number of subcarriers allocated to the sub-PRB transmissions. In some embodiments, for 6 subcarriers, the RU duration is 2 milliseconds. In some embodiments, for 3 subcarriers, the RU duration is 4 milliseconds. In some embodiments, for 1 subcarrier, the RU duration is 8 milliseconds.

According to another aspect, a wireless device for supporting sub-PRB transmissions over a PUSCH is provided. The wireless device includes a transceiver configured to: receive an indication of a number of resource units, RUs, to be used for performing sub-PRB transmissions over the PUSCH. The wireless device 16 also includes processing circuitry configured to map the number of RUs to a number PRBs and determine a transport block size, TBS, for a sub-PRB transmission over the PUSCH based on the mapping of the number of RUs to the number of PRBs. The transceiver is further configured to transmit sub-PRB transmissions over the PUSCH according to the determined TBS on the number of RUs.

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs. In some embodiments, a duration of an RU depends on the number of subcarriers allocated to the sub-PRB transmissions. In some embodiments, for 6 subcarriers, the RU duration is 2 milliseconds. In some embodiments, for 3 subcarriers, the RU duration is 4 milliseconds. In some embodiments, for 1 subcarrier, the RU duration is 8 milliseconds.

According to yet another aspect, a method performed by a network node for supporting sub-PRB transmissions over a PUSCH is provided. The method includes associating a number of subcarriers with a resource unit, RU, duration. The method also includes selecting a transport block size, TBS, for a scheduled sub-PRB transmission. The method further includes mapping a number of PRBs to a number of RUs for the scheduled sub-PRB transmission, the number of PRBs being based on the selected TBS. The method also includes transmitting the number of PRBs, the number of RUs and a TBS index indicating the TBS to a wireless device to be used by the wireless device to transmit sub-PRB transmissions over the PUSCH According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs.

According to another aspect, a network node for supporting sub-PRB transmissions over a PUSCH is provided. The network node includes processing circuitry configured to associate a number of subcarriers with a resource unit, RU, duration, select a transport block size, TBS, for a scheduled sub-PRB transmission, and map a number of PRBs to a number of RUs for the scheduled sub-PRB transmission, the number of PRBs being based on the selected TBS. The network node includes a transceiver configured to transmit the number of PRBs, the number of RUs and a TBS index indicating the TBS to a wireless device to be used by the wireless device to transmit sub-PRB transmissions over the PUSCH.

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs.

An advantage of one or more of the above embodiments is re-use of existing transport block size (TBS) tables which are specified and configured for complete PRB allocations allowing an MTC device to receive sub-PRB scheduling using one or more RUs, and determine transport block sizes using existing PRB allocation tables by mapping the number of allocated RUs to a given number of allocated PRBs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a table used for mapping PRBs and RUs to transport block sizes.

DETAILED DESCRIPTION

Figure 1:
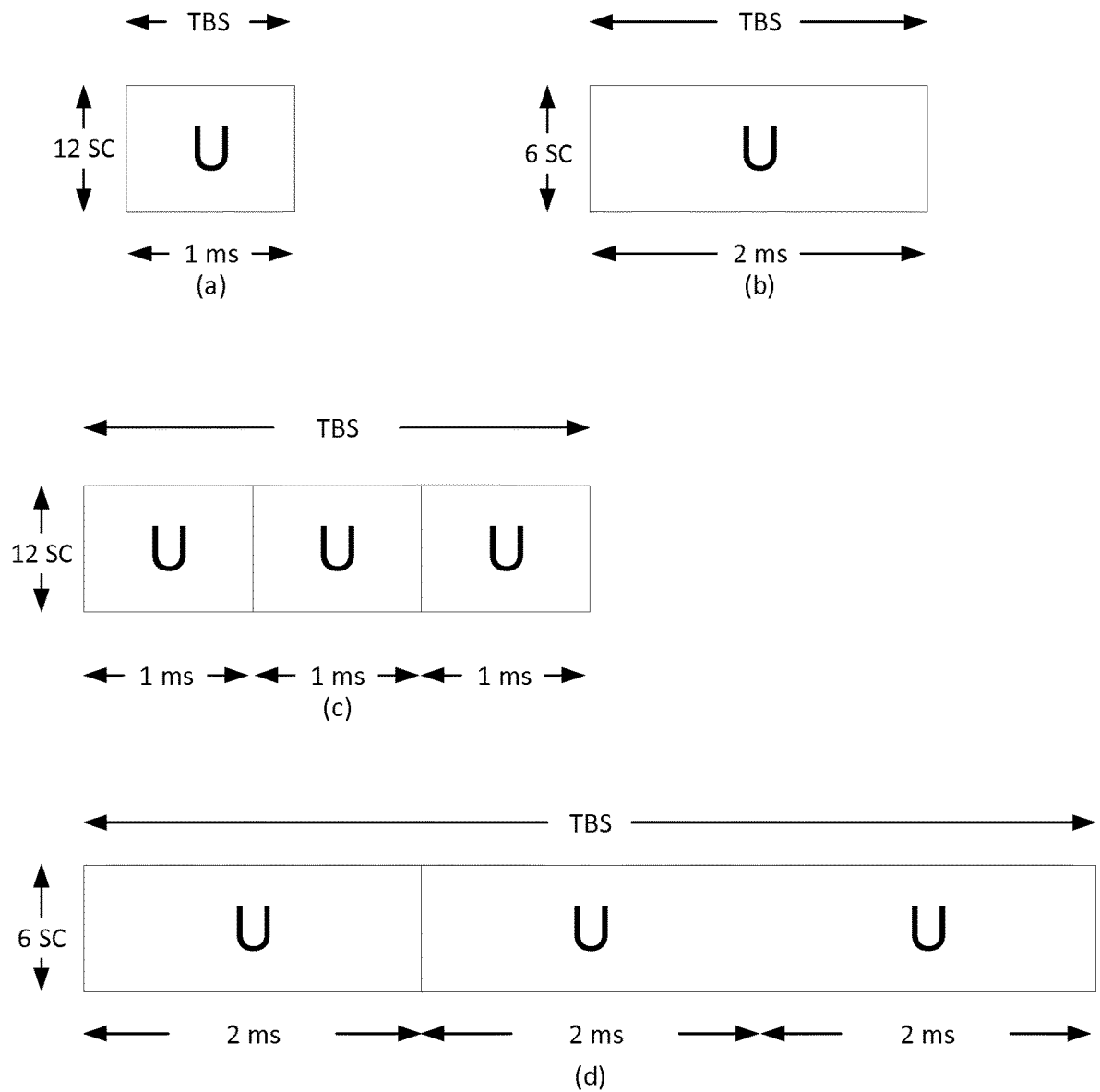
FIG. 1 illustrates TBS mapping over one or multiple resource units.
Figure 2:
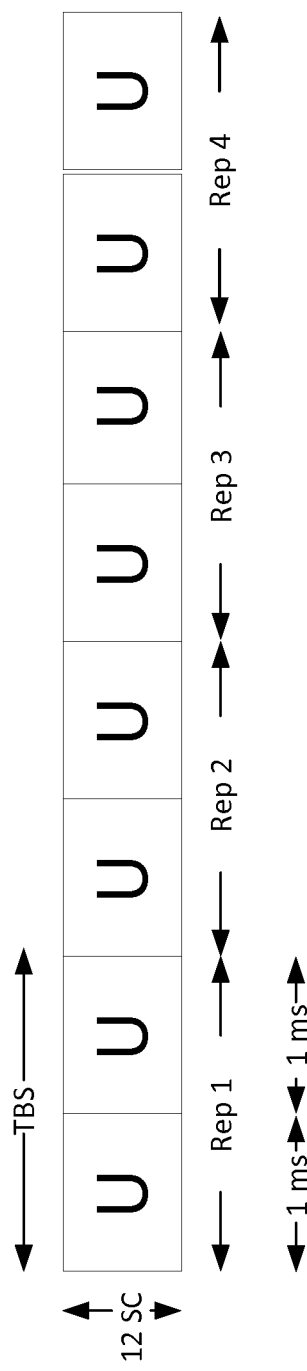
FIG. 2 illustrates TBS mapping over multiple resource units accounting for repetitions.

Before describing in detail exemplary embodiments, it is noted that the embodiments reside primarily in combinations of apparatus components and processing steps related to introducing sub-PRB transmissions over the PUSCH. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The term "wireless device" as used herein may refer to any type of wireless device communicating with a network node and/or with another wireless device in a cellular or mobile communication system. Examples of a wireless device are user equipment (UE), end user device (EUD), CBSD, target device, device to device (D2D) wireless device, machine type wireless device or wireless device capable of machine to machine (M2M) communication, a sensor equipped with UE, PDA, iPAD, Tablet, mobile terminals, smart phone, laptop embedded equipped (LEE), laptop mounted equipment (LME), USB dongles, computer premises equipment (CPE), etc.

The term "network node" used herein may refer to a radio network node or another network node, e.g., a core network node, MSC, MME, O&M, OSS, SON, positioning node (e.g. E-SMLC), MDT node, etc.

The term "network node" or "radio network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Before describing in detail exemplary embodiments, it is noted that the embodiments reside primarily in combinations of apparatus components and processing steps related to adaptation between synchronous and asynchronous operations in a wireless network based on numerology. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Methods for supporting sub-PRB transmissions over the PUSCH by introducing a dual usage (interpretation) of the resources that can be used by a MTC device are introduced. Some advantages for some embodiments include:

By introducing sub-PRB transmissions over the PUSCH, the number of PRBs that can be allocated to a given MTC device can take the role of the number of Resource Units (RU) to be used by the sub-PRB transmissions (i.e., a dual interpretation of resources where the PRBs become RUs for sub-PRB transmissions), which enables inheritance of the RU concept from NB-IoT without imposing significant impacts on either the specifications and/or implementation.

If, for the sub-PRB transmissions, the device is allowed to map a Transport Block over one or more Resource Units, then the TBS table as designed for the PUSCH becomes usable, where a given number of configurable PRBs is mapped to a number of allocated RUs for Multi-tone transmissions.

Figure 3:
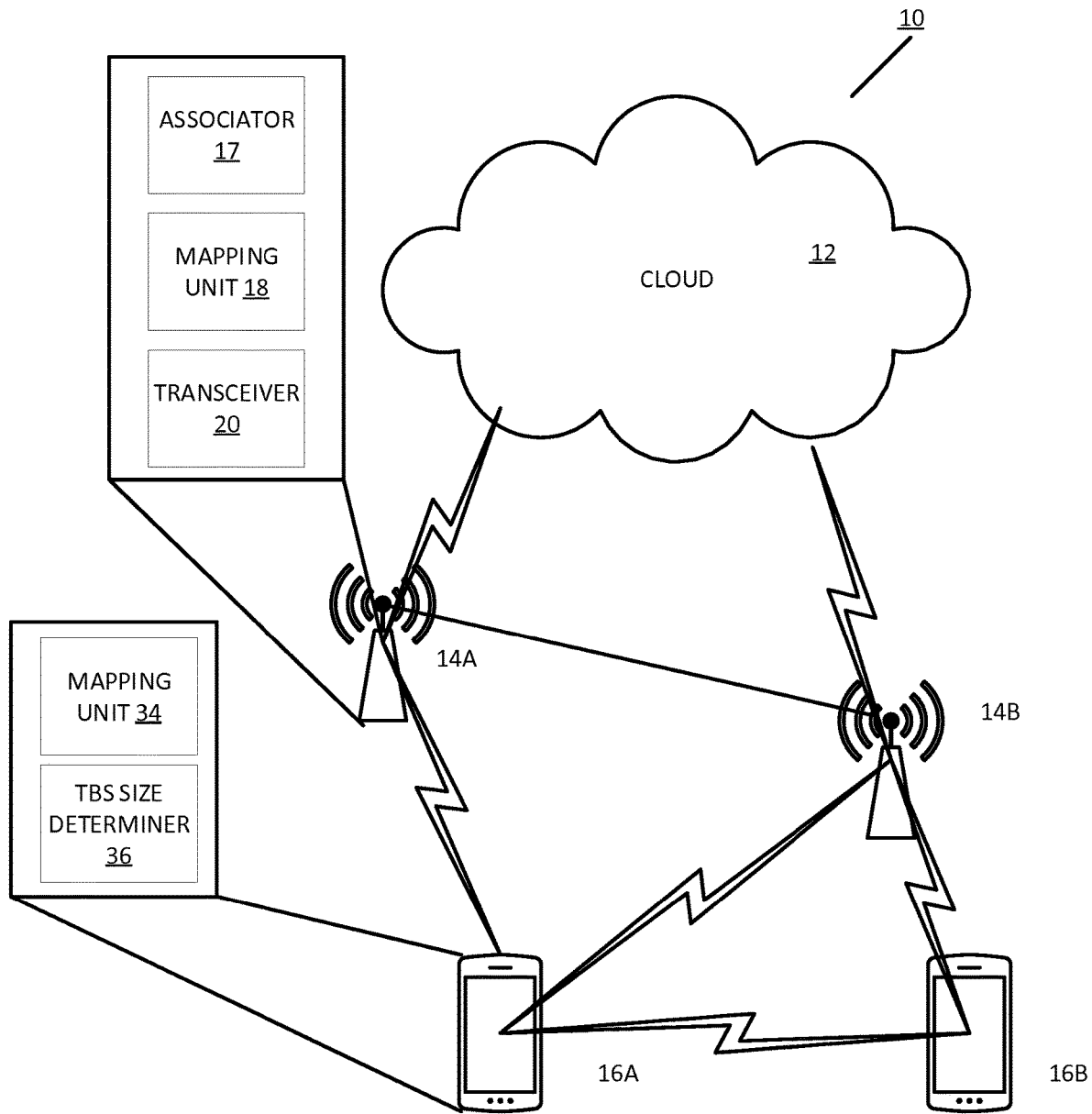
FIG. 3 is a block diagram of a wireless communication system 10 constructed according to principles set forth herein.

Returning to the drawing figures, in which like elements are referred to by like reference designators, there is shown in FIG. 3 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices 16 and network nodes 14. Further, in some embodiments, wireless devices 16 may communicate directly using what is sometimes referred to as a side link connection.

FIG. 3 shows a network node 14 that includes, an associator unit 17, a mapping unit 18 and a transceiver 20. The associator unit 17 is configured to associate a number of subcarriers with a RU duration. The mapping unit 18 is configured to map a number of PRBs to a number of resource units, RU, to be used for the sub-PRB transmissions. The transceiver 20 is configured to transmit the number of PRBs, the number of RUs and a TBS index indicating the TBS to a wireless device 16 to be used by the wireless device to transmit sub-PRB transmissions over the PUSCH.

Figure 4:
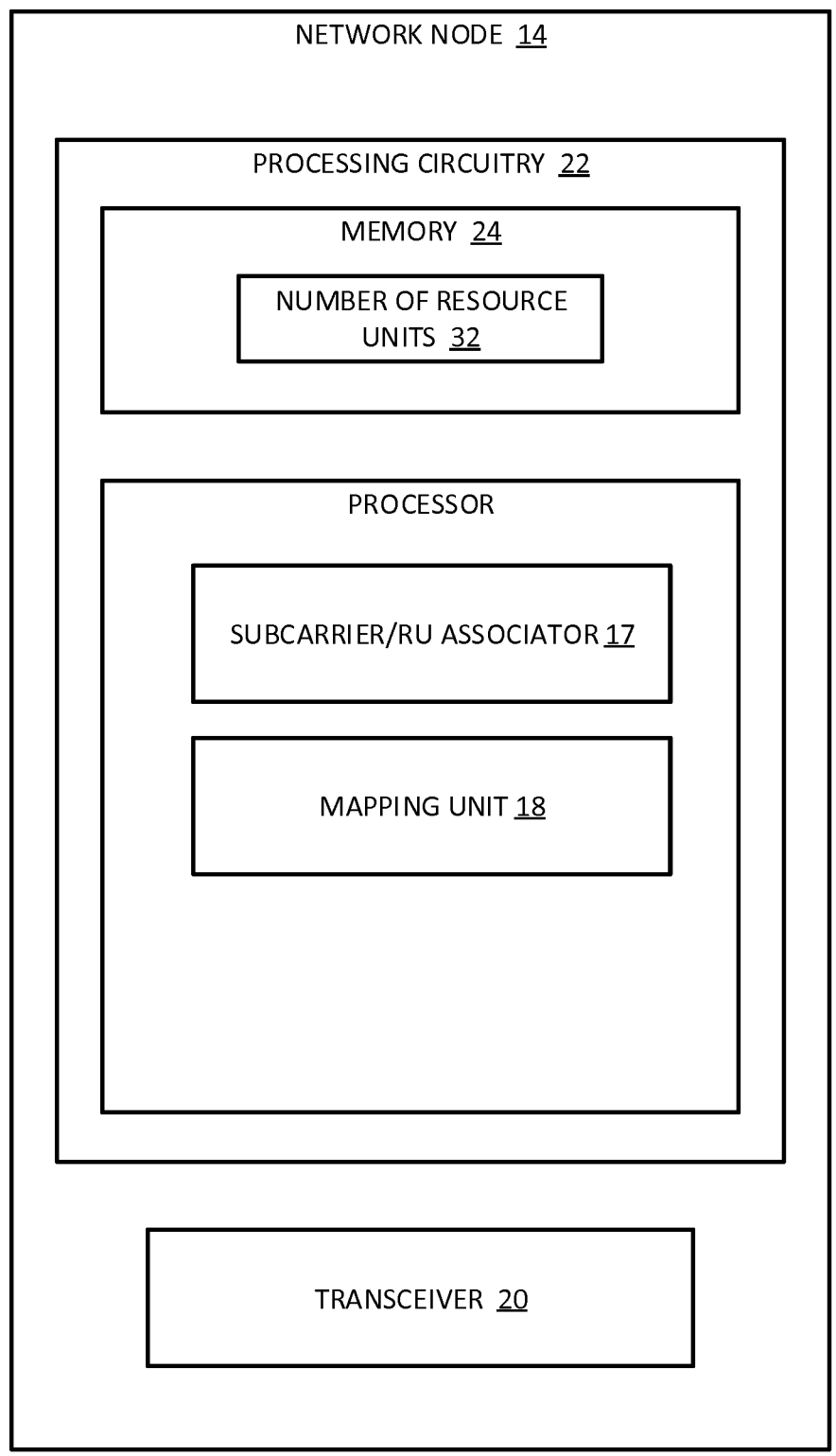
FIG. 4 is a block diagram of a network node configured according to principles set forth herein.

FIG. 4 is a block diagram of a network node 14 configured according to principles set forth herein. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store a number of PRBs 30 and a number of resource units 32. The processor 26 implements the associator unit 17 which is configured to associate a number of subcarriers with an RU duration. The processor also implements a mapping unit 18 configured to map a number of PRBs to RUs for a scheduled sub-PRB transmission. The transceiver 20 is configured to transmit the number of PRBs, the number of RUs and a TBS index indicating the TBS to a wireless device 16 to be used by the wireless device to transmit sub-PRB transmissions over the PUSCH.

Figure 5:
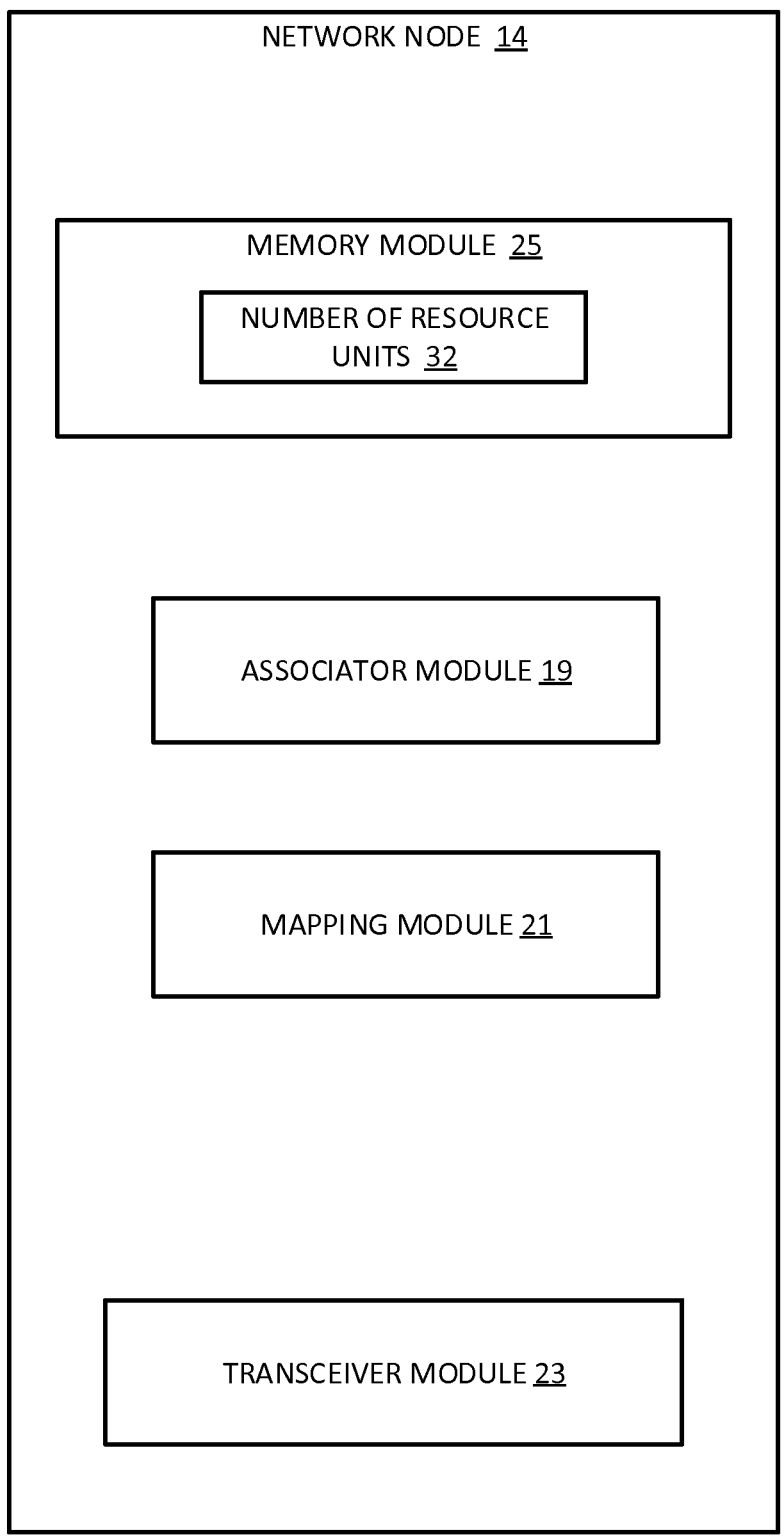
FIG. 5 is a block diagram of an alternative embodiment of a network node constructed in accordance with principles set forth herein.

FIG. 5 is a block diagram of an alternative embodiment of a network node 14 constructed in accordance with principles set forth herein. The network node 14 includes a memory module 25 configured to store the number of resource units 32. The associator module 19 is configured to associate a number of subcarriers with an RU duration. The mapping module 21 is configured to map a number of PRBs to RUs for a scheduled sub-PRB transmission. The transceiver module 23 is configured to transmit the number of PRBs, the number of RUs and a TBS index indicating the TBS to a wireless device 16 to be used by the wireless device to transmit sub-PRB transmissions over the PUSCH.

Figure 6:
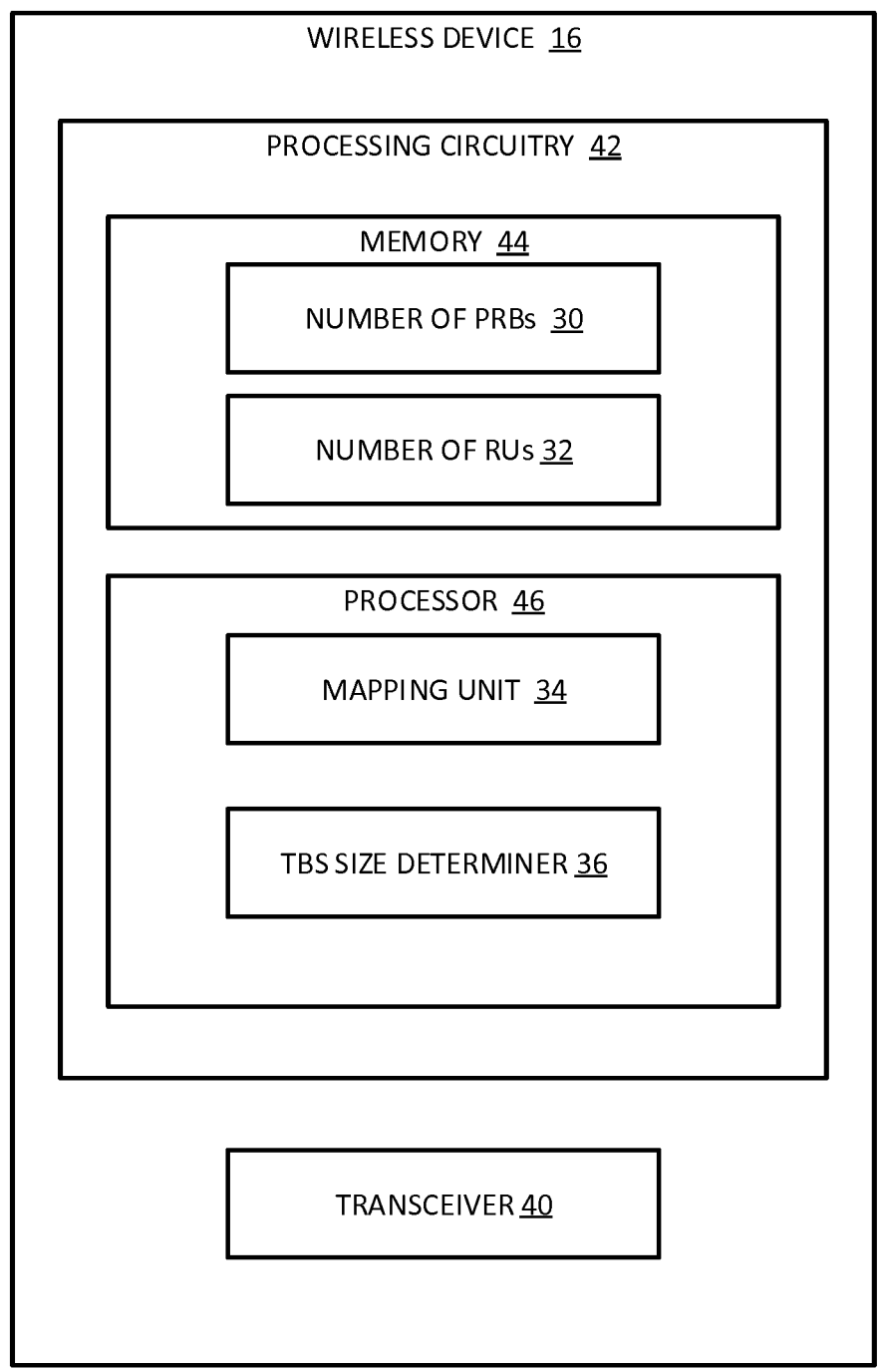
FIG. 6 is a block diagram of a wireless device configured according to principles set forth herein.

FIG. 6 is a block diagram of a wireless device 16 for supporting sub-physical resource block, PRB, transmissions over a physical uplink shared channel, PUSCH. The wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store a number of PRBs 30 and a number of resource units 32. The transceiver 40 is configured to receive from a network node 14 a number of resource units, RU, to be used for the sub-PRB transmissions over the PUSCH. The processing circuitry 42 implements a mapping unit 34 which is configured to map the number of RUs to a number of PRBs. The processing circuitry 42 also implements a TBS size determiner 36 configured to determine a transport block size, TBS, for a sub-PRB transmission over the PUSCH based on the mapping of the number of RUs to the number of PRBs. The transceiver 40 is further configured to transmit the sub-PRBs over the PUSCH according to the determined TBSs on the number of RUs.

Figure 7:
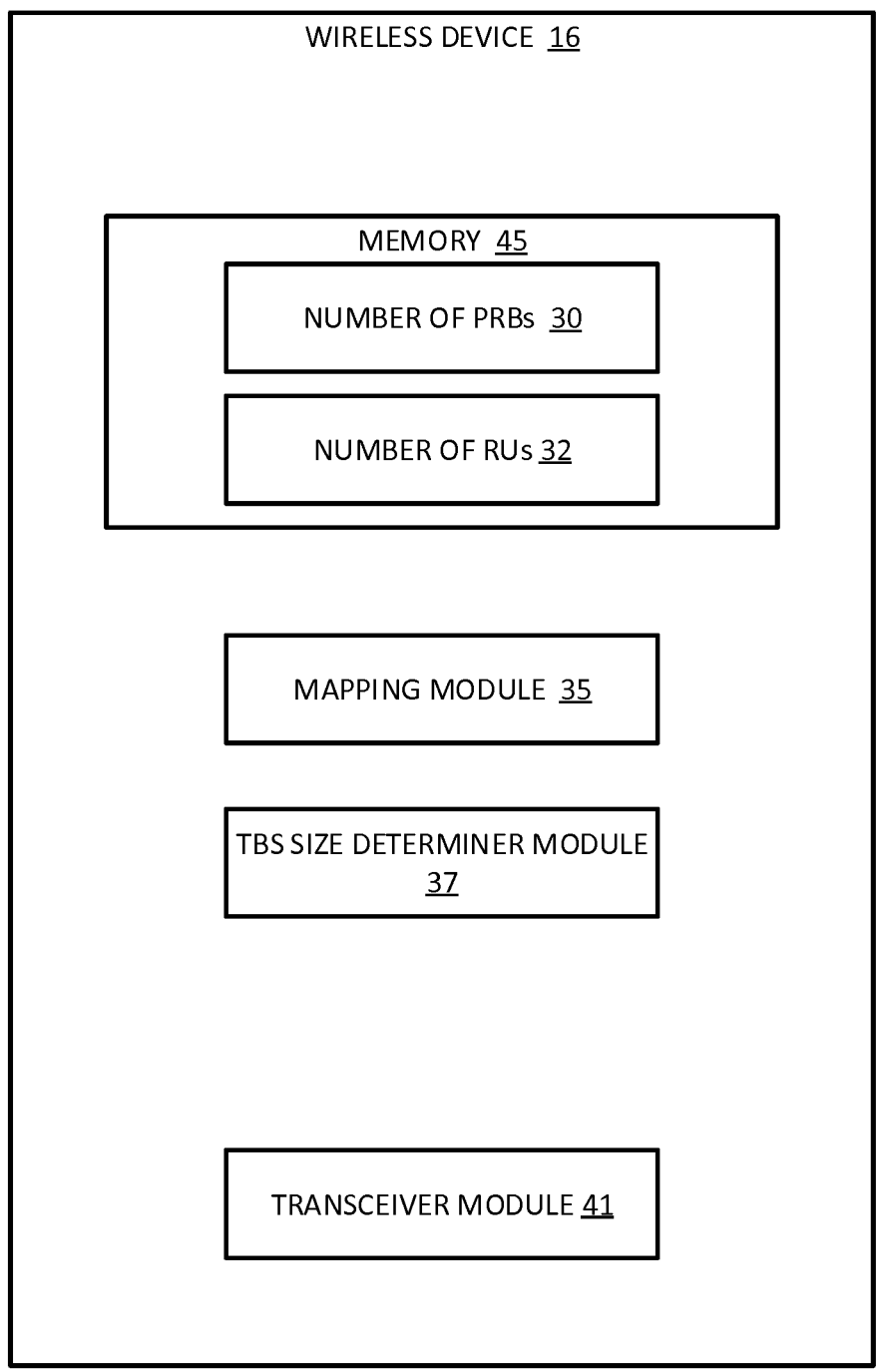
FIG. 7 is a block diagram of an alternative embodiment of a wireless device constructed in accordance with principles set forth herein.

FIG. 7 is block diagram of an alternative embodiment of a wireless device 16 that includes a memory module 45 to store a number of PRBs 30 and resource units (RUs) 32. A transceiver module 41 is configured to receive from a network node 14 a number of RUs allocated to the wireless device 16, to be used for the sub-PRB transmissions, and transmit the sub-PRBs over the PUSCH using the number of RUs. The mapping module 35 is configured to map the number of RUs to a number of PRBs. The TBS size determiner module 37 is configured to determine a transport block size, TBS, for a sub-PRB transmission over the PUSCH based on the mapping of the number of RUs to the number of PRBs.

Figure 8:
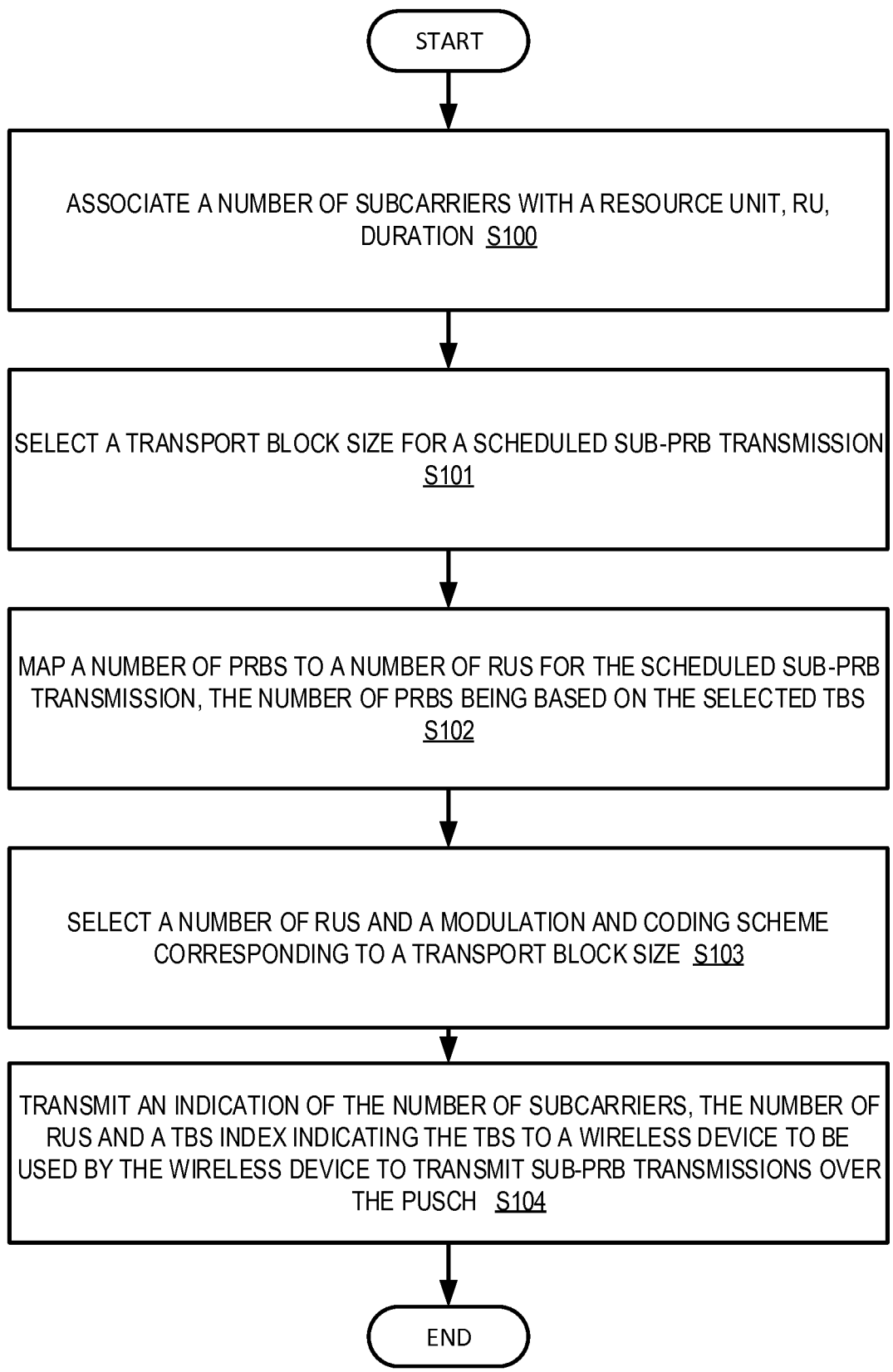
FIG. 8 is a flowchart of an exemplary process in a wireless device for supporting sub-PRB transmission over a PUSCH.

FIG. 8 is a flowchart of an example process in a network node 14 for supporting sub-PRB transmissions over a PUSCH. The process includes associating (block S100), via the associator 18, a number of subcarriers with a resource unit, RU, duration. The process also includes selecting (block S101), via the processing circuitry 22, a transport block size, TBS, for a scheduled sub-PRB transmission. The process further includes mapping (block S102) a number of PRBs to a number of RUs for the scheduled sub-PRB transmission, the number of PRBs being based on the selected TBS and selecting (block S103) a number of RUs and a modulation and coding scheme corresponding to a transport block size. The process also includes transmitting (block S104), via the transceiver 20, an indication of the number of subcarriers, the number of RUs and a TBS index indicating the TBS to a wireless device 16 to be used by the wireless device 16 to transmit sub-PRB transmissions over the PUSCH.

Figure 9:
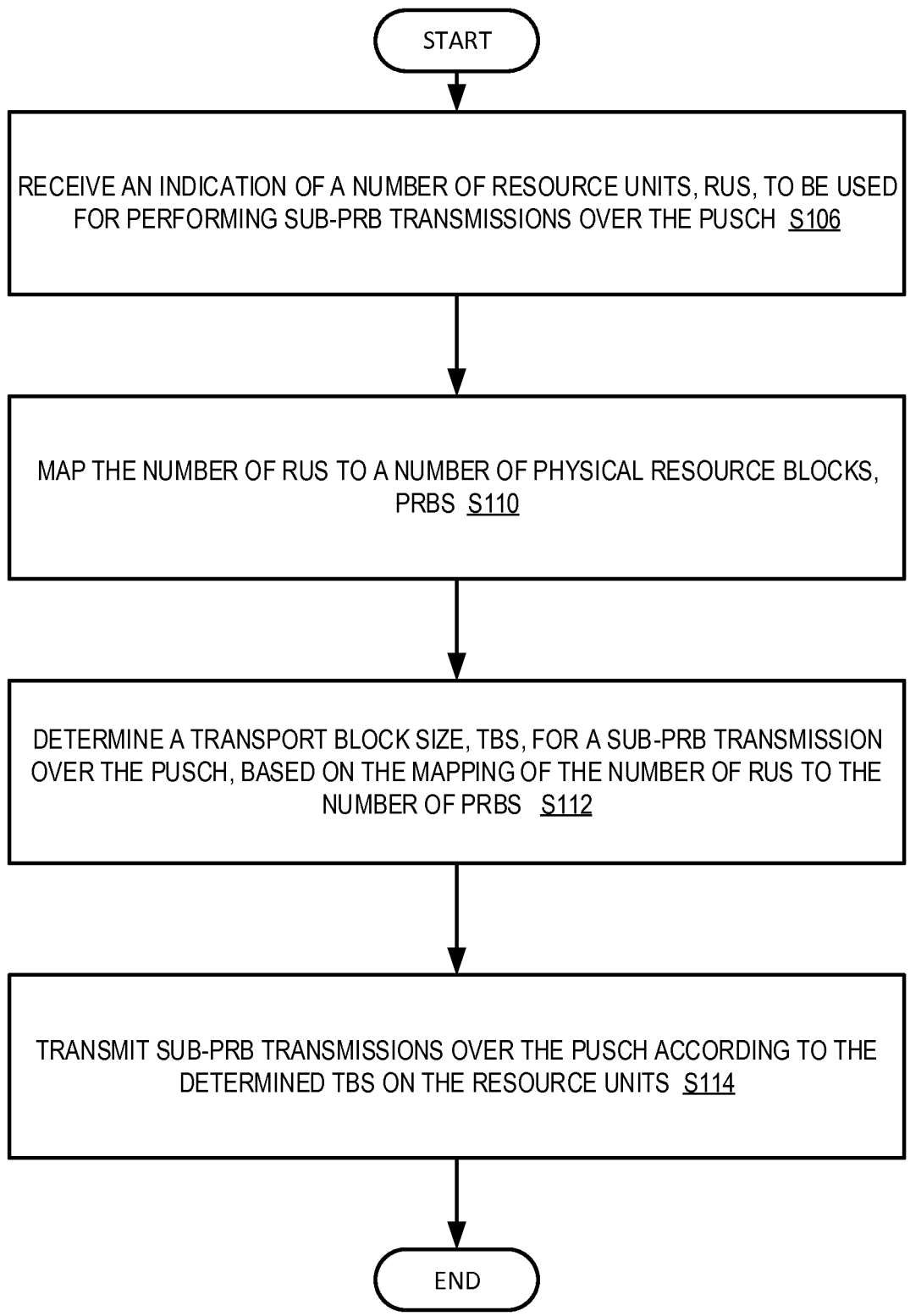
FIG. 9 is a flowchart of an exemplary process in a network node for supporting sub-PRB transmission over a PUSCH.

FIG. 9 is a flowchart of an example process in a wireless device 16 for supporting sub-PRB transmissions over a PUSCH. The process includes receiving, via the transceiver 40, an indication of a number of resource units, RUs, to be used for performing sub-PRB transmissions over the PUSCH (block S106). The process further includes mapping, via the mapping unit 34, the number of RUs to a number of PRBs (block S110). The process includes determining, via the TBS size determiner 36, a transport block size, TBS, for a sub-PRB transmission over the PUSCH, based on the mapping of the number of RUs to the number of PRBs (block S112). The process also includes transmitting, via the transceiver 40, sub-PRB transmissions over the PUSCH according to the determined TBS on the number of RUs (block S114).

Having described the general process flow of arrangements of the disclosure and having provided examples of hardware and software arrangements for implementing the processes and functions of the disclosure, the sections below provide details and examples of arrangements for supporting sub-PRB transmissions over a PUSCH.

The sub-PRB allocation for PUSCH can inherit the resource unit (RU) concept from NB-IoT, minimizing the specifications and implementation impacts by using one of the following strategies:

Alternative A: For a sub-PRB allocation over the PUSCH, the RU length can vary as a function of the number of allocated subcarriers following the NB-IoT design, mapping the TBS only over one RU (i.e., every repetition consists of one RU).

Alternative B: For a sub-PRB allocation over the PUSCH, the RU length can vary as a function of the number of allocated subcarriers following the NB-IoT design, mapping the TBS over one RU or multiple resource units (i.e., every repetition may consist of more than one RU).

For both alternatives above, the RU length as an example follows the NB-IoT design depicted in Table 2.

TABLE 2

One example of sub-PRB allocation for PUSCH using a RU of variable length and following the NB-IoT design

| Subcarrier spacing | Slot duration | Number of allocated subcarriers | Length of the Resource Unit |
| --- | --- | --- | --- |
| 15 KHz | 0.5 ms | 12 | 1 ms |
| | | 6 | 2 ms |
| | | 3 | 4 ms |
| | | 1 | 8 ms or 12 ms |

Introducing the RU Concept by Re-Using the TBS Tables Designed for PUSCH

The PUSCH is covered by two Coverage Extension modes, CE mode A and B. In CE mode A, the PUSCH is modulated with QPSK or 16QAM and is mapped to between 1 and 6 PRBs anywhere within a narrowband. In CE mode B, the PUSCH is modulated with QPSK and mapped to 1 or 2 PRBs within a narrowband. In Rel-14 of the 3GPP standard, CE mode A was updated to support a maximum channel bandwidth consisting of up to 24 PRB. Accounting for the existing CE modes, the subsections below describe as an example how the TBS tables as they were designed for PUSCH can be re-used to adopt the resource unit concept for supporting the sub-PRB technique by using the strategies "A" and "B" described above.

Alternative A: In Sub-PRB Over PUSCH, the TBS is Mapped Only Over One RU (i.e., Every Repetition Consists of One RU)

CE Mode A: According to the 3GPP Rel-13 standard, the maximum channel bandwidth is 6 PRBs, but in the 3GPP Rel-14 standard, the maximum channel bandwidth became 24 PRBs. Nonetheless, this approach reuses the TBS table as designed for the PUSCH but focuses only on 1 PRB, which is used to take the role of 1 RU.

TABLE 3

One example of a TBS table as designed for the PUSCH in CE mode A, re-used to adopt the RU concept for supporting the sub-PRB technique by using at most 1RU

| MCS index | Modulation scheme | TBS index | CE mode A # PRBs (Number of resource units ($N_{RU}$) for sub-PRB allocations) 1 |
| --- | --- | --- | --- |
| 0 | QPSK | 0 | 16 |
| 1 | QPSK | 1 | 24 |
| 2 | QPSK | 2 | 32 |
| 3 | QPSK | 3 | 40 |
| 4 | QPSK | 4 | 56 |
| 5 | QPSK | 5 | 72 |
| 6 | QPSK | 6 | 328 |
| 7 | QPSK | 7 | 104 |
| 8 | QPSK | 8 | 120 |
| 9 | QPSK | 9 | 136 |
| 10 | QPSK | 10 | 144 |
| 11 | 16QAM | 10 | 144 |
| 12 | 16QAM | 11 | 176 |
| 13 | 16QAM | 12 | 208 |

TABLE 3-continued

One example of a TBS table as designed for the PUSCH
in CE mode A, re-used to adopt the RU concept for supporting
the sub-PRB technique by using at most 1RU

| MCS index | Modulation scheme | TBS index | CE mode A # PRBs (Number of resource units ($N_{RU}$) for sub-PRB allocations) 1 |
|---|---|---|---|
| 14 | 16QAM | 13 | 224 |
| 15 | 16QAM | 14 | 256 |

CE Mode B: The maximum channel bandwidth is 2 PRBs; similarly as it was done above for CE Mode A, the first PRB among the two available PRBs would take the role of 1 RU.

This approach uses only 1RU for sub-PRB transmissions over the PUSCH (see the legend inserted to the Tables under "#PRBs", which enables the dual usability of resources). Nonetheless, it is possible to transmit the larger packets associated with the TBS linked for example to the number of PRBs excluded in Tables 4 and 5 (i.e., PRBs beyond 1). In that case, packet segmentation at higher layers has to be applied to fit the TB sizes as defined for 1PRB.

TABLE 4

One example of a TBS table as designed for PUSCH in
CE mode B, re-used to adopt the RU concept for supporting
the sub-PRB technique by using at most 1RU

| MCS index | Modulation scheme | TBS index | CE mode B # PRBs (Number of resource units ($N_{RU}$) for sub-PRB allocations) 1 |
|---|---|---|---|
| 0 | QPSK | 0 | 56 |
| 1 | QPSK | 1 | 88 |
| 2 | QPSK | 2 | 144 |
| 3 | QPSK | 3 | 176 |
| 4 | QPSK | 4 | 208 |
| 5 | QPSK | 5 | 224 |
| 6 | QPSK | 6 | 256 |
| 7 | QPSK | 7 | 328 |
| 8 | QPSK | 8 | 392 |
| 9 | QPSK | 9 | 456 |
| 10 | QPSK | 10 | 504 |
| 11 | 16QAM | 10 | Unused |
| 12 | 16QAM | 11 | |
| 13 | 16QAM | 12 | |
| 14 | 16QAM | 13 | |
| 15 | 16QAM | 14 | |

Alternative B: In Sub-PRB Over PUSCH, the TBS is Mapped Over One or More RU (i.e., Every Repetition May Consist of More than One RU)

As an example, when a subcarrier allocation consisting of 3 subcarriers is used along with a MCS index and TBS index equal to 6, then the Transport Block consisting of 256 bits would be mapped over a single Resource Unit lasting for 4 ms.

Note that in CE mode B, the maximum number of repetitions that can be used is 2048, which leads to a maximum transmission length of 2048 ms. Thus, if upon introducing the Resource Unit concept for sub-PRB transmissions over PUSCH, the maximum transmission length is intended to be preserved, then the maximum number of repetitions for the sub-PRB allocations may be revised as follows:

Maximum number of repetitions would be 1024, 512, and 256 for 6, 3, and 1 subcarriers, respectively.

CE Mode A (as per 3GPP Rel-13): The maximum channel bandwidth is 6 PRBs, which means that a device might simultaneously use a maximum of 12 subcarriers in each of the 6 PRBs (i.e., 12*6=72 subcarriers being utilized at the same time by the same device).

The above suggests a limitation on the number of Resource Units to be used for sub-PRB in the PUSCH. That is, in order to keep a fair usage of resources the following should apply:

For 6 subcarriers having a RU equal to 2 ms, one could use at most 6 RUs (i.e., 6*2*6=72).

For 3 subcarriers having a RU equal to 4 ms, one could use at most 6 RUs (i.e., 3*4*6=72).

For 1 subcarrier having a RU equal to 8 ms, one could use at most 9 RUs (i.e., 1*8*9=72).

Accounting for the above, the RU concept can be adopted by re-using the existing TBS table for PUSCH in CE Mode A (except for 1 subcarrier, since RUs beyond 6 and up to 9 are not defined and they would have to be introduced), such as Table 5

TABLE 5

One example of a TBS table as designed for PUSCH in
CE mode A, re-used to adopt the RU concept for supporting
the sub-PRB technique by using up to 6 RU

| MCS index | Modulation scheme | TBS index | CE mode A # PRBs (Number of resource units ($N_{RU}$) for sub-PRB allocations) | | | | | |
|---|---|---|---|---|---|---|---|---|
| | | | 1 | 2 | 3 | 4 | 5 | 6 |
| 0 | QPSK | 0 | 16 | 32 | 56 | 88 | 120 | 152 |
| 1 | QPSK | 1 | 24 | 56 | 88 | 144 | 176 | 208 |
| 2 | QPSK | 2 | 32 | 72 | 144 | 176 | 208 | 256 |
| 3 | QPSK | 3 | 40 | 104 | 176 | 208 | 256 | 328 |
| 4 | QPSK | 4 | 56 | 120 | 208 | 256 | 328 | 408 |
| 5 | QPSK | 5 | 72 | 144 | 224 | 328 | 424 | 504 |
| 6 | QPSK | 6 | 328 | 176 | 256 | 392 | 504 | 600 |
| 7 | QPSK | 7 | 104 | 224 | 328 | 472 | 584 | 712 |
| 8 | QPSK | 8 | 120 | 256 | 392 | 536 | 680 | 808 |
| 9 | QPSK | 9 | 136 | 296 | 456 | 616 | 776 | 936 |
| 10 | QPSK | 10 | 144 | 328 | 504 | 680 | 872 | 1032 |
| 11 | 16QAM | 10 | 144 | 328 | 504 | 680 | 872 | 1032 |
| 12 | 16QAM | 11 | 176 | 376 | 584 | 776 | 1000 | 1192 |
| 13 | 16QAM | 12 | 208 | 440 | 680 | 904 | 1128 | 1352 |

CE Mode A (as per 3GPP Rel-14): The maximum channel bandwidth is 24 PRBs, which means that a device might simultaneously use a maximum of 12 subcarriers in each of the 24 PRBs (i.e., 12*24 = 288 subcarriers being utilized at the same time by the same device).

In order to keep a fair usage of resources we should have:

For 6 subcarriers having a RU equal to 2 ms, one could use at most 24 RUs (i.e., 6*2*24=288).

For 3 subcarriers having a RU equal to 4 ms, one could use at most 24 RUs (i.e., 3*4*24=288).

For 1 subcarriers having a RU equal to 8 ms, one could use at most 36 RUs (i.e., 1*8*36=288).

Accounting for the above, the RU concept can be adopted by re-using the existing TBS table for PUSCH in 3GPP Rel-14 CE Mode A (except for 1 subcarrier, since RUs beyond 24 and up to 36 are not defined and they would have to be introduced).

Introducing the RU concept when the maximum channel bandwidth is 24 PRB requires adding 12 new columns to the existing 3GPP Rel-14 table if a single tone were decided to be specified. On the other hand, when the maximum channel bandwidth is 6 PRBs, only three RU columns (i.e., 7RU, 8RU, 9RU) would be required to be added to the existing Rel-13 table in case single-tone were decided to be adopted. (Actually, the three missing RU columns could be borrowed from the Rel-14 table). Therefore, it may be more appropriate and convenient to use the 3GPP Rel-13 TBS table as a baseline for introducing sub-PRB over the PUSCH.

CE Mode B: The maximum channel bandwidth is 2 PRBs, which means that a device might simultaneously use a maximum of 12 subcarriers in each of the 2 PRBs (i.e., 12*2=24 subcarriers being utilized at the same time by the same device).

In order to keep a fair usage of resources the following should apply:

For 6 subcarriers having a RU equal to 2 ms, one could use at most 2 RUs (i.e., 6*2*2=24).

For 3 subcarriers having a RU equal to 4 ms, one could use at most 2 RUs (i.e., 3*4*2=24).

For 1 subcarriers having a RU equal to 8 ms, one could use at most 3 RUs (i.e., 1*8*3=24).

Accounting for the above, the RU concept can be adopted by re-using the existing TBS table for PUSCH in CE Mode B (except for 1 subcarrier, since a RU equal to 3 is not defined, but may be introduced), such as Table 6

TABLE 6

One example of a TBS table as designed for PUSCH in CE mode B, re-used to adopt the RU concept for supporting the sub-PRB technique by using up to 2 RU.

| MCS index | Modulation scheme | TBS index | CE mode B # PRBs (Number of resource units ($N_{RU}$) for sub-PRB allocations) | |
|---|---|---|---|---|
| | | | 1 | 2 |
| 0 | QPSK | 0 | 56 | 152 |
| 1 | QPSK | 1 | 88 | 208 |
| 2 | QPSK | 2 | 144 | 256 |
| 3 | QPSK | 3 | 176 | 328 |
| 4 | QPSK | 4 | 208 | 408 |
| 5 | QPSK | 5 | 224 | 504 |
| 6 | QPSK | 6 | 256 | 600 |
| 7 | QPSK | 7 | 328 | 712 |
| 8 | QPSK | 8 | 392 | 808 |
| 9 | QPSK | 9 | 456 | 936 |
| 10 | QPSK | 10 | 504 | 1032 |
| 11 | 16QAM | 10 | Unused | |
| 12 | 16QAM | 11 | | |
| 13 | 16QAM | 12 | | |
| 14 | 16QAM | 13 | | |
| 15 | 16QAM | 14 | | |

In this approach, the PRBs simply take the role of RUs (see the legend inserted in the Tables under "#PRBs", which enables the dual usability of resources), which makes possible for sub-PRB, re-use of the full TBS table as designed for the PUSCH.

Common Aspects of Alternative A and B for Introducing Sub-PRB Transmissions Over PUSCH Overall, for introducing sub-PRB transmissions over the PUSCH, the number of PRB that can be allocated to a given MTC device can take the role of the number of Resource Units (i.e., a dual interpretation of resources where the PRB become RU for sub-PRB transmissions), which enables inheritance of the RU concept from NB-IoT without imposing significant impacts on both specifications and implementation.

The modulation scheme can be unified to QPSK for the TBS that in principle requires the usage of a higher order modulation (i.e., 16-QAM). Indication via higher layers can be used to perform a fall back to QPSK when those TBS are to be used, and repetitions using different redundancy versions for transmitting such a large TB sizes are relied upon. This approach is, as in long term evolution (LTE), previously described as "QPSK modulation override".

For introducing sub-PRB transmissions over the PUSCH, the number of Physical Resource Blocks (PRB) that can be allocated to a given MTC device can be interpreted as the number of Resource Units (RU) to be used for performing sub-PRB transmissions (i.e., a dual interpretation of resources where the PRBs become RUs for sub-PRB transmissions), which allows inheritance of the RU concept from NB-IoT without imposing significant impacts on both specifications and implementation.

Thus, in some embodiments, an existing PRB table may be reused to indicate numbers of transport block sizes for a given number of resource units. An example of such a table is shown in FIG. 10. The shaded values of column 2, indicated by label A, are the transport block sizes for a given MCS when the number of resource units is equal to 1. The shaded values of column 3, indicated by label B, are the transport block sizes for a given MCS when the number of resource units is equal to 2. The shaded values of column 6, indicated by label C, are the transport block sizes for a given MCS when the number of resource units is equal to 4. Accordingly, when a base station indicates to the wireless device 16 that a number of RUs is to be utilized by the wireless device 16 for transmitting the PUSCH, and further indicates an MCS index, the wireless device 16 chooses a column of the table of FIG. 10 based on the received number of RUs and chooses a row of the table of FIG. 10 corresponding to the received MCS index. The chosen row and column indicate the transport block size for transmitting then PUSCH transmissions.

Several observations can be made, as follows:

Observation 1: In CE mode B, the maximum transmission length of 2048 ms. If the maximum transmission length is intended to be preserved for sub-PRB transmissions over PUSCH using the RU concept, then the maximum number of repetitions for the sub-PRB allocations may be revised as: Max repeats {1024, 512, 256} for {6, 3, 1} subcarriers, respectively.

Performing sub-PRB transmissions over PUSCH by using only one RU makes it also possible to transmit larger packets: in that case packet segmentation at higher layers may be applied to fit the TB sizes as defined for 1 PRB.

Observation 2: Sub-PRB transmissions over PUSCH using one RU can be used to transmit larger packets: in that case packet segmentation at higher layers may be applied to fit the TB sizes as defined for 1 PRB.

If supporting larger Transport Blocks than the ones available under PRB #1 were deemed important, then one possibility could consist of borrowing TBs from the set of values associated to the PRB #2 to fill-in the unused fields in PRB #1. That is, TBs equal to 600 bits, 712 bits, 808 bits, 936 bits and 1032 bits would be associated to the TBS index from 11 to 15.

Observation 3: If supporting larger Transport Blocks than the ones available under PRB #1 were deemed important, then one possibility could consist of borrowing TBs from the set of values associated to the PRB #2 to fill-in the unused fields in PRB #1.

Moreover, the modulation scheme can be unified to QPSK for the TBs that in principle would require the usage of a higher order modulation (i.e., 16-QAM). Higher layers could be indicated as a fall back to QPSK, and reliance may be on repetitions using different redundancy versions for transmitting such a large TB sizes.

Observation 4: If larger Transport Blocks than the ones available under PRB #1 are supported, the modulation scheme can be unified to QPSK for the TBs that in principle would require the usage of a higher order modulation (i.e., 16-QAM). Higher layers could be indicated as a fall back to QPSK, and reliance may be on repetitions using different redundancy versions for transmitting such a large TB sizes.

According to one aspect, a method performed by a wireless device 16 for supporting sub-PRB transmissions over a PUSCH is provided. The method includes receiving an indication of a number of resource units, RUs, to be used for performing sub-PRB transmissions over the PUSCH (block S106). The method further includes mapping the number of RUs to a number of physical resource blocks, PRBs (block S110) and determining a transport block size, TBS, for a sub-PRB transmission over the PUSCH, based on the mapping of the number of RUs to the number of PRBs (block S112). The method also includes transmitting sub-PRB transmissions over the PUSCH according to the determined TBS on the number of RUs (block S114).

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs. In some embodiments, a duration of an RU depends on the number of subcarriers allocated to the sub-PRB transmissions. In some embodiments, for 6 subcarriers, the RU duration is 2 milliseconds. In some embodiments, for 3 subcarriers, the RU duration is 4 milliseconds. In some embodiments, for 1 subcarrier, the RU duration is 8 milliseconds.

According to another aspect, a wireless device 16 for supporting sub-PRB transmissions over a PUSCH is provided. The wireless device 16 includes a transceiver configured to: receive an indication of a number of resource units, RUs, to be used for performing sub-PRB transmissions over the PUSCH. The wireless device 16 also includes processing circuitry configured to map the number of RUs to a number PRBs and determine a transport block size, TBS, for a sub-PRB transmission over the PUSCH based on the mapping of the number of RUs to the number of PRBs. The transceiver is further configured to transmit sub-PRB transmissions over the PUSCH according to the determined TBS on the number of RUs.

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs. In some embodiments, a duration of an RU depends on the number of subcarriers allocated to the sub-PRB transmissions. In some embodiments, for 6 subcarriers, the RU duration is 2 milliseconds. In some embodiments, for 3 subcarriers, the RU duration is 4 milliseconds. In some embodiments, for 1 subcarrier, the RU duration is 8 milliseconds.

According to yet another aspect, a method performed by a network node 14 for supporting sub-PRB transmissions over a PUSCH is provided. The method includes associating (block S100) a number of subcarriers with a resource unit, RU, duration. The method also includes selecting (block S101) a transport block size, TBS, for a scheduled sub-PRB transmission. The method further includes mapping (block S102) a number of PRBs to a number of RUs for the scheduled sub-PRB transmission, the number of PRBs being based on the selected TBS. The method also includes transmitting (block S104) the number of PRBs, the number of RUs and a TBS index indicating the TBS to a wireless device 16 to be used by the wireless device 16 to transmit sub-PRB transmissions over the PUSCH.

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs.

According to another aspect, a network node 14 for supporting sub-PRB transmissions over a PUSCH is provided. The network node 14 includes processing circuitry configured to associate a number of subcarriers with a resource unit, RU, duration, select a transport block size, TBS, for a scheduled sub-PRB transmission, and map a number of PRBs to a number of RUs for the scheduled sub-PRB transmission, the number of PRBs being based on the selected TBS. The network node 14 includes a transceiver configured to transmit the number of PRBs, the number of RUs and a TBS index indicating the TBS to a wireless device 16 to be used by the wireless device 16 to transmit sub-PRB transmissions over the PUSCH.

According to this aspect, in some embodiments, when the number of RUs to be used for performing sub-PRB transmissions over the PUSCH is 1, the mapping is to 2 PRBs. In some embodiments, when the number of RUs to be used for performing sub-PRB transmissions over the PUSCH is 2, the mapping is to 3 PRBs. In some embodiments, when the number of RUs to be used for performing sub-PRB transmissions over the PUSCH is 4, the mapping is to 6 PRBs.

In some embodiments, a method in a wireless device 16 for supporting sub-physical resource block, sub-PRB, transmissions over a physical uplink shared channel, PUSCH, is provided. The method includes receiving from a network node 14 a number of PRBs allocated to the wireless device 16 which are interpreted as a number of resource units, RU, to be used for performing sub-PRB transmissions over PUSCH; wherein the transport block to be transmitted using a sub-PRB allocation over PUSCH is mapped over the number of allocated RUs.

In some embodiments, a wireless device 16 for supporting sub-physical resource block, PRB, transmissions over a physical uplink shared channel, PUSCH, is provided. The wireless device 16 includes a transceiver 40 configured to: receive from a network node 14 a number of PRBs allocated to the wireless device 16 which are interpreted as a number of resource units, RU, to be used for performing sub-PRB transmissions over PUSCH; wherein the transport block to be transmitted using a sub-PRB allocation over PUSCH is mapped over the number of allocated RUs.

In some embodiments, a wireless device 16 for supporting sub-physical resource block, PRB, transmissions over a physical uplink shared channel, PUSCH, is provided. The wireless device 16 includes a transceiver module 41 configured to receive from a network node 14 a number of PRBs allocated to the wireless device 16 which are interpreted as a number of resource units, RU, to be used for performing sub-PRB transmissions over PUSCH, where the transport block to be transmitted using a sub PRB allocation over PUSCH is mapped over the number of allocated RUs.

In some embodiments, a method in a network node 14 for supporting sub-physical resource block, PRB, transmissions over a physical uplink shared channel, PUSCH, by a wireless device 16 is provided. The method includes determining a number of PRBs to allocate to the wireless device 16; mapping the number of PRBs to a number of resource units, RUs, to be used by the wireless device 16 to transmit the sub-PRBs over the PUSCH; and transmitting at least one of the number of PRBs and an indication of the number of RUs to the wireless device 16.

In some embodiments, the number of RUs for sub-PRB allocations are a function of a transport block size index. In some embodiments, a transport block size is mapped over only one RU. In some embodiments, a transport block size is mapped over more than one RU. In some embodiments, the network node 14 can allocate one of 3 subcarriers with a RU having a length equal to 4 ms, 6 subcarriers with a RU having a length equal to 2 ms, and 1 subcarrier with a RU having a length equal to 8 ms.

In some embodiments, a network node 14 for supporting sub-physical resource block, PRB, transmissions over a physical uplink shared channel, PUSCH, by a wireless device 16 is provided. The network node 14 includes processing circuitry 22 configured to: determine a number of PRBs to allocate to the wireless device 16; map the number of PRBs to a number of resource units, RUs, to be used by the wireless device 16 to transmit the sub-PRBs over the PUSCH. The network node 14 includes a transceiver 20 configured to transmit the number of PRBs and an indication of the number of RUs to the wireless device 16. In some embodiments, the number of RUs for sub-PRB allocations are a function of a transport block size index. In some embodiments, a transport block size is mapped over only one RU. In some embodiments the network node 14 can allocate one of 3 subcarriers with a RU having a length equal to 4 ms, 6 subcarriers with a RU having a length equal to 2 ms, and 1 subcarrier with a RU having a length equal to 8 ms.

In some embodiments, a network node 14 for supporting sub-physical resource block, PRB, transmissions over a physical uplink shared channel, PUSCH, by a wireless device 16 is provided. The network node 14 includes processing circuitry 22 configured to: determine a number of PRBs to allocate to the wireless device 16; map the number of PRBs to a number of resource units, RUs, to be used by the wireless device 16 to transmit the sub-PRBs over the PUSCH. The network node 14 includes a transceiver 20 configured to transmit at least one of the number of PRBs and an indication of the number of RUs to the wireless device 16. Note that in some embodiments, the PRB allocation and interpreting the allocation as a sub-PRB allocation, and using the TBS table to determine the number of RUs based on one or more factors, may include without limitation signalling or wireless device capabilities, etc.

| Abbreviation | Explanation |
|---|---|
| efeMTC | Even Further Enhanced MTC for LTE |
| DL | Downlink |
| FDD | Frequency-division duplex |
| LTE | Long Term Evolution |
| MTC | Machine Type Communications |
| NB-IoT | Narrowband Internet of Things |
| PRB | Physical Resource Block |
| PUSCH | Physical Uplink Shared Channel |
| RU | Resource Unit |
| Sub-PRB | Sub-Physical Resource Block |
| TB | Transport Block |
| TBS | Transport Block Size |
| UL | Uplink |
| WID | Work Item Description |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a wireless device for supporting sub-physical resource block, sub-PRB, transmissions over a physical uplink shared channel, PUSCH, the method comprising:
receiving an indication of a number of resource units, RUs, to be used for performing sub-PRB transmissions over the PUSCH;
receiving a modulation coding scheme, MCS, index;
determining a transport block size, TBS, for a sub-PRB transmission over the PUSCH the determining corresponding to:
selecting a row of a plurality of rows of a table configured for a full PRB transmission corresponding to the received MCS index;
selecting a column of a plurality of columns of the table based on the indicated number of RUs;
mapping the indicated number of RUs to the selected column according to one of:
an indicated number of 1 RU being mapped to a column for 2 full PRBs;
an indicated number of 2 RUs being mapped to a column for 3 full PRBs; and
an indicated number of 4 RUs being mapped to a column for 6 full PRBs; and
each of the plurality of columns representing a number of full PRBs that would be allocated to the wireless device in a full PRB transmission over the PUSCH; and
transmitting sub-PRB transmissions over the PUSCH according to the determined TBS on the indicated number of RUs.

2. The method of claim 1, wherein a duration of an RU depends on a number of subcarriers allocated to the sub-PRB transmissions.

3. The method of claim 2, wherein for 6 subcarriers, the RU duration is 2 milliseconds.

4. The method of claim 2, wherein for 3 subcarriers, the RU duration is 4 milliseconds.

5. The method of claim 2, wherein for 1 subcarrier, the RU duration is 8 milliseconds.

6. A wireless device for supporting sub-physical resource block, sub-PRB, transmissions over a physical uplink shared channel, PUSCH, the wireless device comprising:
a transceiver configured to:
receive an indication of a number of resource units, RUs, to be used for performing sub-PRB transmissions over the PUSCH;
processing circuitry configured to:
receive a modulation coding scheme, MCS, index; and
determine a transport block size, TBS, for a sub-PRB transmission over the PUSCH by the determining corresponding to:
selecting a row of a plurality of rows of a table configured for a full PRB transmission corresponding to the received MCS index;
selecting a column of a plurality of columns of the table based on the indicated number of RUs;
mapping the indicated number of RUs to the selected column according to one of:
an indicated number of 1 RU being mapped to a column for 2 full PRBs;
an indicated number of 2 RUs being mapped to a column for 3 full PRBs; and
an indicated number of 4 RUs being mapped to a column for 6 full PRBs; and
each of the plurality of columns representing a number of full PRBs that would be allocated to the wireless device in a full PRB transmission over the PUSCH; and
the transceiver further configured to:
transmit sub-PRB transmissions over the PUSCH according to the determined TBS on the indicated number of RUs.

7. The wireless device of claim 6, wherein a duration of an RU depends on a number of subcarriers allocated to the sub-PRB transmissions.

8. The wireless device of claim 7, wherein for 6 subcarriers, the RU duration is 2 milliseconds.

9. The wireless device of claim 7, wherein for 3 subcarriers, the RU duration is 4 milliseconds.

10. The wireless device of claim 7, wherein for 1 subcarrier, the RU duration is 8 milliseconds.

11. A method performed by a network node for supporting sub-physical resource block, sub-PRB, transmissions by a wireless device over a physical uplink shared channel, PUSCH, the method comprising:
associating a number of subcarriers with a resource unit, RU, duration;
selecting a number of RUs;
selecting a modulation coding scheme, MCS, index;

determining a transport block size, TBS, for a scheduled sub-PRB transmission over the PUSCH the determining corresponding to:
   selecting a row of a plurality of rows of a table configured for a full PRB transmission corresponding to the selected MCS index;
   selecting a column of a plurality of columns of the table based on the indicated number of RUs;
   mapping the indicated number of RUs to the selected column according to one of:
      an indicated number of 1 RU being mapped to a column for 2 full PRBs;
      an indicated number of 2 RUs being mapped to a column for 3 full PRBs; and
      an indicated number of 4 RUs being mapped to a column for 6 full PRBs; and
   each of the plurality of columns representing a number of full PRBs that would be allocated to the wireless device in a full PRB transmission over the PUSCH; and
transmitting the number of RUs, the MCS index, and a TBS index indicating the TBS to the wireless device to be used by the wireless device to transmit sub-PRB transmissions over the PUSCH.

12. A network node for supporting sub-physical resource block, sub-PRB, transmissions by a wireless device over a physical uplink shared channel, PUSCH, the network node comprising:
   processing circuitry configured to:
      associate a number of subcarriers with a resource unit, RU, duration;
      selecting a number of RUs;
      selecting a modulation coding scheme, MCS, index;
      determining a transport block size, TBS, for a scheduled sub-PRB transmission over the PUSCH, the determining corresponding to selecting:
         a row of a plurality of rows of a table configured for a full PRB transmission, the selected row corresponding to the selected MCS index; and
         a column of a plurality of columns of the table based on the indicated number of RUs, the indicated number of RUs being mapped to the selected column according to one of:
            an indicated number of 1 RU being mapped to a column for 2 full PRBs;
            an indicated number of 2 RUs being mapped to a column for 3 full PRBs; and
            an indicated number of 4 RUs being mapped to a column for 6 full PRBs; and
      each of the plurality of columns representing a number of full PRBs that would be allocated to the wireless device in a full PRB transmission over the PUSCH; and
   a transceiver configured to transmit the number of RUs, the MCS index, and a TBS index indicating the TBS to the wireless device to be used by the wireless device to transmit sub-PRB transmissions over the PUSCH.

* * * * *